United States Patent [19]

Askew et al.

[11] Patent Number: 5,182,744

[45] Date of Patent: Jan. 26, 1993

[54] TELECOMMUNICATIONS NETWORK RESTORATION ARCHITECTURE

[75] Inventors: James D. Askew, Ellenwood, Ga.; Chin-Wang Chao, Lincroft, N.J.; David R. Cochran, Easton, Pa.; Peter M. Dollard, Highlands, N.J.; Hossein Eslambolchi, Freehold, N.J.; William E. Goodson, Freehold, N.J.; Robert P. Guenther, Red Bank, N.J.; Omar M. Mansour, West Long Branch, N.J.; Liem T. Nguyen, Colts Neck, N.J.; Sarma S. Tanuku, Howell, N.J.

[73] Assignee: AT&T Bell Laboratories, Murray Hill, N.J.

[21] Appl. No.: 637,244

[22] Filed: Jan. 3, 1991

[51] Int. Cl.[5] .................................................. H04J 1/16
[52] U.S. Cl. ....................................... 370/16; 370/85.8
[58] Field of Search ................... 370/16, 55, 54, 94.3; 379/221

[56] References Cited

U.S. PATENT DOCUMENTS

| | | | |
|---|---|---|---|
| 3,394,231 | 7/1968 | Hopper et al. | 379/221 |
| 3,870,955 | 3/1975 | Ouvrier | 340/825.01 |
| 4,284,852 | 8/1981 | Szybicki et al. | 379/221 |
| 4,345,116 | 8/1982 | Ash et al. | 379/221 |
| 4,680,776 | 7/1987 | Ikeuchi | 30/46 |
| 4,704,724 | 11/1987 | Krishnan et al. | 379/221 |
| 4,825,206 | 4/1989 | Brice et al. | 370/16 |
| 4,853,927 | 8/1989 | Wenzel | 370/16 |
| 4,862,496 | 8/1989 | Kelly et al. | 379/221 |
| 4,885,780 | 12/1989 | Gopal et al. | 379/221 |
| 4,924,459 | 5/1990 | Angell | 370/55 |
| 4,991,204 | 2/1991 | Yamamoto | 379/901 |
| 4,999,829 | 3/1991 | Fite, Jr. et al. | 370/16 |

OTHER PUBLICATIONS

Trans. Inst. Electron. Inf. & Commun., vol. J70B, No. 4, pp. 432–442, Apr. 1987, H. Inamori, "Performance Evaluation of Mutual . . . ".

IEEE/IEICE Global Telecom. Conf. 1987, vol. 2 of 3, Nov. 15-18, 1987, S. Hasegawa et al., pp. 1096–1100, "Dynamic Reconfiguration of Digital Cross-Connect Systems with Network . . . ".

Data Communications, Apr. 1988, W. Cohen et al., pp. 175–183; "Building a Private Wide-Area, Fiber Backbone Network".

Primary Examiner—Douglas W. Olms
Assistant Examiner—T. Samuel
Attorney, Agent, or Firm—F. B. Luludis

[57] ABSTRACT

A restoration system is provided for enhancing the reliability of a telecommunications network such that particular traffic which is disrupted by, for example, a faulty link, may be quickly rerouted via an alternate route established "on the fly". In particular, each node and link forming the network is monitored, and in the event that such monitoring detects a faulty link or node then a central controller is notified. The controller is arranged to locate spare capacity and establish an alternate route, in which the continuity of the alternate route is confirmed before the disrupted traffic is transferred thereto.

20 Claims, 5 Drawing Sheets

TABLE 1

| | LINK | NODE | NODE | S-CAP |
|---|---|---|---|---|
| 202 | 101 | 100-1 | – | 36 |
| | 102 | 100-1 | 100-2 | 36 |
| 203 | 103 | 100-2 | 100-3 | 0 |
| | 104 | 100-3 | 100-4 | 36 |
| | 105 | 100-4 | 100-5 | 36 |
| 206 | 106 | 100-1 | 100-6 | 36 |
| 208 | 107 | 100-6 | 100-4 | 50 |
| | 108 | 100-2 | 100-7 | 85 |
| 209 | 109 | 100-7 | 100-8 | 25 |
| | 110 | 100-8 | 100-9 | 36 |
| | 111 | 100-9 | 100-4 | 60 |

TELECOMMUNICATIONS NETWORK RESTORATION ARCHITECTURE

TECHNICAL FIELD

The invention relates to telecommunications networks, and more particularly relates to a network architecture which automatically routes traffic in the event of a network failure.

BACKGROUND OF THE INVENTION

A disruption in telecommunications services in a network is typically caused by an inoperable communications path (link) or equipment within a service providing office (node). A disruption of such services could be very costly to business users who rely on telecommunications services in the operation of their businesses. For example, a particular business could lose revenue as a result of a failure to receive so-called "telemarketing sales" when a disruption in telecommunications services occurs. Moreover, the amount of such lost revenue would be directly proportional to the duration of the disruption. The provider of such telecommunications services would also lose revenue, since the disruption would decrease the number of calls that the associated network could process.

The length of the duration is typically based on a number of factors, such as, for example, (a) the amount of time required to identify the location of the service disruption; (b) the amount of time that is used to identify one or more routes that could be used to alternate route affected traffic around the service disruption; and (c) the amount of time that is used to actually establish such routes.

Most telecommunications networks typically deal with a service disruption by selecting an alternate route around the inoperable link or service providing node. One goal in doing so is to select the most efficient alternate route, one having the least number of nodes and links.

Accordingly, there is need for an arrangement which quickly locates a service disruption, identifies alternate routes and then establishes such routes, such that a service disruption minimally affects the telecommunications user (subscriber).

SUMMARY OF THE INVENTION

An advance in telecommunications switching is obtained by providing a service restoration facility which quickly locates and deals with a fault such that an interruption in communications services that is caused by the fault is virtually transparent to subscribers. Such restoration is achieved, in accord with the invention, by providing at each service node automatic cross-connect means for terminating the end points of communication links entering and leaving the service node, monitoring the operability of each such link and node to quickly identify a service disruption, and notifying a central facility when such a disruption occurs. As an aspect of the invention, the central facility locates spare circuits in individual ones of the links and then establishes, in real time, one or more orders of connectivity (alternate routes) for the rerouting of traffic affected by the interruption, in which the continuity of each such order of connectivity is confirmed before the affected traffic is transferred thereto.

DETAILED DESCRIPTION

Figures 1, 2:
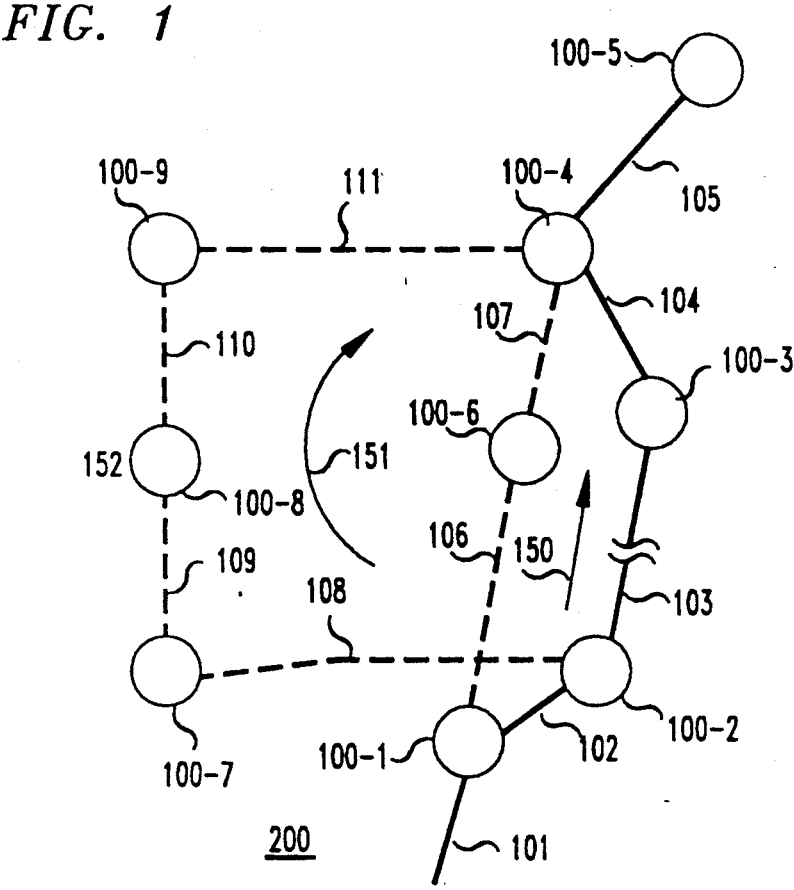
FIG. 1 is a broad diagram of a telecommunications network comprising a plurality of nodes and links interconnecting individual pairs of such nodes.
FIG. 2 illustrates a table for tracking the spare capacity in individual ones of the links shown in FIG. 1.

Turning now to FIG. 1, there is shown a simplified diagram of a telecommunications network 200, which may be, for example, the AT&T digital network, comprising a plurality of nodes. For the sake of brevity and clarity only a small number of such nodes is shown in the figure, namely nodes 100-1 through 100-9. Each such node, includes, inter alia, what is commonly referred to as a Digital Cross-connect Arrangement (DCA) of the type known in the art. One exemplary arrangement which may be advantageously employed as a DCA is the Digital Access and Cross-Connect System III commercially available from AT&T.

It is seen from the figure, that service nodes 100-1 through 100-9 are interconnected via respective ones of the links 101 through 111. Such links may be, for example, optical fiber cables. Within network 200, the respective end points of a link, e.g., link 103, terminate at an associated node, e.g., node 100-2, in which the termination circuitry includes so-called Line Termination Equipment (LTE) designed to interface optical fibers with a DCA. In this way, a DCA cross-connects signals that are transported via optical fibers (or other broadband digital transport systems) that are in service, and thereby determines the routing of such signals. What this means is that a signal received via one link may then be electronically cross-connected (routed) to one of a number of other links also connecting via an LTE to the DCA, in which the cross-connection is based on the destination of the signal, and in which the destination may be the associated node itself or one of the other network nodes.

Thus a DCA, for example, the DCA contained in node 100-1, operates as a conduit for routing signals from an originating node, for example, node 100-1, to a terminating node, for example, node 100-5.

As mentioned above, the optical fibers forming a link terminate on an LTE. In an exemplary embodiment of the invention, such an LTE may be, for example, the well-known FT series G lightwave system commercially available from AT&T. In particular, the FT series G lightwave system is a high-capacity, digital optical-transport system that provides maintenance options and other features such as wavelength and time division multiplexing. During transmission, a multiplexed group of DS3 signals received via an optical fiber and entering a FT series G terminal is first resynchronized and demultiplexed from the line rate and then supplied individually to the DCA at the DS3 rate so that they may be switched to an appropriate outgoing fiber, or line. (DS3 stands for Digital Signal, third level and equals a transmission rate of approximately 44.736 Mbs.) From a maintenance standpoint, an FT series G terminal monitors such signals to track errors as they occur, in which such errors include, for example, framing and synchronization errors. A loss of synchronization is typically indicative of fiber failure, e.g., a fiber which has been inadvertently cut.

Each node also includes an alarm processor, which monitors key components of its associated node, such as the associated LTE equipment. That is, the alarm processor periodically polls, for example, once a second, the associated LTE equipment for alarms that occurred during a preceding period, in which such alarms are indicative of, for example, the aforementioned framing and synchronization errors. Upon receipt of an alarm, the alarm processor initiates a so-called "leaky bucket" process to track whether the alarm is indicative of either an intermittent or a persistent (hard) fault. More particularly, for a particular alarm, the alarm processor increments an associated alarm counter by a predetermined value—illustratively two—and decrements that counter by another predetermined value—illustratively one—at the end of each successive polling session during which no alarm is received. Thus, in the case of an intermittent fault the associated counter would be decremented to a value of zero after the second successive polling session. However, if the alarm persists, then the value contained in the counter will reach a predetermined threshold value—illustratively 10—within a short period of time.

The presence of a large number of DS3 alarms accelerates the "leaky bucket" process, in which the threshold is adapted downward so that such a failure may be recognized quickly. When a particular counter reaches a threshold value, then the alarm processor sends to an associated central controller a message identifying the associated alarm and the failed DS3 circuit. Upon receipt of the message, the central controller starts a window timer to await for possible receipt of messages identifying other failed DS3 circuits. That is, if an alarm is indicative of a cable which has been inadvertently cut, then, during the window, the central controller accumulates a list of all of the DS3 circuits contained in the optical fibers which have failed as result of the cut cable.

In the typical instance, where just a few DS3 circuits have failed, and a sufficient number of spare DS3 circuits are available in the associated optical fiber cable, then the associated node will activate such spares and transfer the traffic affected by the failed DS3 circuits thereto. However, in the instance where the list indicates that most of the DS3 circuits in a cable have failed, then the alarm processor notifies the central controller. The central controller responsive to such notification invokes a program implementing a service restoration algorithm which alternate routes traffic that is affected by the failed cable.

Such a restoration algorithm, although not pertinent to the present invention, could be one that is based on the notion of "knowing" such alternate routes beforehand. Alternatively, the restoration algorithm could be one in which such alternate routes are not known beforehand and are thus established "on the fly". In the latter case, the restoration algorithm is designed to locate spare DS3 circuits that may be contained in other links, which are then placed in service to establish one or more alternate routes for the rerouting of the affected traffic. One such restoration scheme is disclosed in co-pending U.S. patent application Ser. No. 504,359, filed on Apr. 4, 1990 on behalf of M. O. Mansour et al.

Thus, if it is assumed that a particular link, for example, link 103, fails, then the resulting alarms accumulated by the alarm processors contained in nodes 100-2 and 100-3 will cause those processors to send to the central controller (not shown in FIG. 1) messages identifying the failure (alarm). The central controller responsive thereto invokes the restoration program to locate spare capacity in other ones of the links and establish alternate route(s) for the rerouting of the affected traffic.

More specifically, the central controller identifies such alternate routes by (a) determining the identity of the failure-end offices, which in the present example, would be nodes 100-2 and 100-3; (b) then determining in real time the least number of links and associated (intermediate) nodes that may be used to establish a possible loop whose end points terminate at the failure-end offices; (c) then determining the identity of each so-called transfer-end node; and (d) then determining the identities of the intermediate nodes that would be used to establish the loop.

In particular, the identity of each link in the network as well as the identities of the nodes connecting thereto is maintained in a link table, an example of which is shown in FIG. 2. It is seen from the figure, that each line of TABLE 1 identifies a respective network link and identifies the nodes which connect to the end points thereof. In addition, the last column of TABLE 1 (S-CAP) identifies the number of available spare DS3 circuits in the identified link, in which the number of spare DS3 circuits for a given link is updated as such spares are placed in and out of service, or become faulty, in accordance with status messages received from respective alarm processors. Accordingly, then, it is a simple matter to index TABLE 1 and read out the identities of the failed end offices which connect to respective end points of link 103, which in the present case happen to be nodes 100-2 and 100-3, as shown at line 202.

Once the failure-end nodes have been identified, then the central controller identifies the shortest loop around the failed link. This is done by mapping, in real time and in the form of a tree-like structure, various paths contained in Table 1, in which the paths begin at one of the failure-end nodes, e.g., node 100-2 and lead to the other failure-end node, e.g., node 100-3. The path which is first to lead (terminate) at node 100-3 is then selected as being the shortest loop around failed link 103. Specifically, and referring to both FIGS. 1 and 2, the arrangement determines from lines 202 and 208 that node 100-2 connects to nodes 100-1 and 100-7 via links 102 and 108, respectively, and forms the first level of the tree. At a second level of the tree, the arrangement then determines from TABLE 1 (line 207) that node 100-7 connects to node 100-8 via link 109. The arrangement proceeds in a similar manner for node 100-1, and continues building the tree in the manner just described.

The central controller terminates the process when one of the paths of the tree is first to reach node 100-3, as shown for the path comprising nodes 100-1, 100-6, 100-4 and links 102, 106, 107 and 104. As mentioned above, the first path of the tree which reaches node 100-3 will be the shortest path around the failed link.

The central controller then identifies the transfer-end nodes by noting which nodes are contained in both the failed path (i.e., nodes 100-1, 100-2, 100-3 100-4), and the shortest loop (i.e., nodes 100-2, 100-1, 100-6, 100-4 and 100-3). In the present illustrative example, nodes 100-1 and 100-4 would be the transfer-end nodes since they are common to both paths. The arrangement then identifies the intermediate nodes by noting which nodes are contained in the shortest loop between the transfer-end nodes but not in the original path. As such, node 106 would be identified as being the intermediate node. (It is noted that the shortest loop is defined herein as being the first order of connectivity around the failed link, i.e., a connectivity comprising the fewest number of links.)

It is seen in FIG. 1, that the central controller has identified loop 150 comprising nodes 100-2, 100-1, 100-6, 100-4 and 100-3 and links 106 and 107 as the shortest and most efficient alternate route for rerouting the original traffic around inoperable link 103.

Once loop 150 has been identified, then the central controller sends to each intermediate node, e.g., node 100-6 a set of commands causing the DCA contained in that node to cross-connect the spare capacity of link 106 to the spare capacity of link 107 in order to extend the new path defining the alternate route. Each such command comprises a number of fields specifying the order of switching signals to so-called ports on the DCA of node 100-6 which terminate the ends of spare DS3 circuits of link 106 to the ends of the spare DS3 circuits of link 107. The central controller then sends to the DCA at transfer-end node 100-4 a set of commands directing the order of cross-connecting between the ports which terminate the opposite ends of the spare DS3 circuits of link 107 to the ports terminating the DS3s of link 105 which transported the original traffic. The central controller then sends to the DCA of node 100-1 a set of commands directing the order of cross-connecting between the ports terminating the failed DS3s of link 101 and ports terminating the ends of the spare DS3s of link 106 connecting to node 100-1.

In a similar manner, other portions of the total failed traffic carried by failed link 103 which is not restored to service may also be rerouted via a path established from other spare DS3 circuits forming another loop, or order of connectivity, having different pairs of transfer-end nodes, as illustrated by loop 151 comprising nodes 100-7 through 100-9 and node 100-4 and links 108 through 111.

It is seen from the foregoing that the inventive architecture quickly deals with a service disruption or a degradation in service, thereby making such a disruption nearly transparent to the network user.

Figure 3:
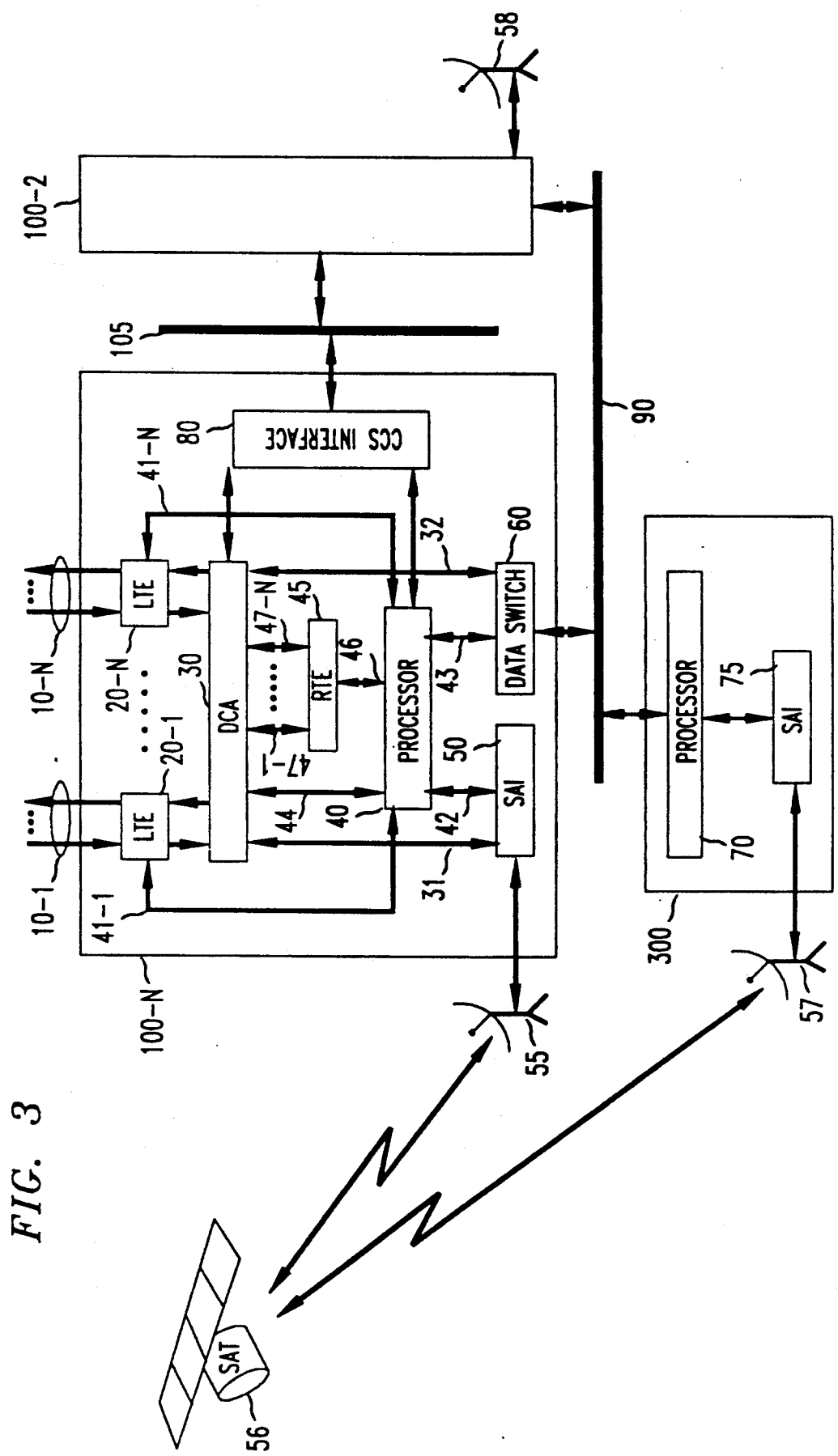
FIG. 3 is a broad block diagram of a node of FIG. 1 including the inventive service restoration architecture.

Turning now to FIG. 3, there is shown in block diagram form an illustrative embodiment of the inventive restoration architecture. In particular, node 100-N generally represents any one of the nodes forming network 200 and includes DCA 30, alarm processor 40, satellite antenna interface (SAI) 50 for interfacing DCA 30 and processor 40 with antenna 55, and data switch 60 for interfacing DCA 30 and processor 40 with data network 90.

As mentioned above, DCA 30 may be the Digital Access and Cross-Connect system III available from AT&T. Optical fiber cables 10-1 through 10-N represent any one of the links, e.g., links 102, 103, 104, etc., which forms network 200. Each of the DS3 circuits multiplexed on the optical fibers forming cables 10-1 through 10-N connects to a respective port of DCA 30 via one of the LTE 20-1 through 20-N. As mentioned above, besides providing termination sites for the individual fibers of a cable, each LTE is also arranged to monitor the operability and status (in or out of service) of the aforementioned DS3 circuits terminating thereat and, when polled by processor 40, report, via a respective one of the communications busses 41-1 through 41-N, the status of such operability.

As also mentioned above, in response to receipt of an alarm, processor 40 initiates a so-called "leaky bucket" process to determine if the associated fault is either an intermittent or persistent ("hard") fault. If processor 40, which may be, for example, the 68000 DELTA series computer available from Motorola, Inc., determines that an alarm might be due to a hard fault, then it sends to central controller (operations system) 300 via bus 42, SAI 50, dish antenna 55 and satellite 56 a report indicative of that fact. (Satellite 56, may be, for example, the well-known AT&T Skynet satellite communications service.) Such a report is formed into a message using the well-known X.25 message protocol resulting in so-called base-band signals representing the data conveyed by the report. SAI 50, which may be, for example, the Indoor Unit (IDU) available from the Tridom Corporation, modulates such baseband signals using an intermediate frequency (IF) carrier and then modulates the result using a radio frequency (RF) carrier in KU band for presentation to dish antenna 55. Dish antenna 55, in turn, transmits the modulated signals to satellite 56, which then retransmits the signals for receipt by dish antenna 57 connected to SAI 75. SAI 75, which is similar to SAI 50, demodulates the signals and supplies to processor 70 of central controller 300 the resulting processor 40 message.

It is noted that if processor 40 (or DCA 30) cannot access antenna 55, for whatever reason, then processor 40 (or DCA 30) may transmit such a message via data network 90, which may be, for example, the AT&T Accunet packet network. In such an instance, processor 40 (or DCA 30) interfaces with network 90 via X.25 data switch 60 comprising a number of data modules such as, for example, data modules models 3001-201 and 2003-001 as well as driving software identified by model number 3709-201 available from the Telematics Corporation. In such an instance, then, processor 40 supplies the message to data switch 60 for retransmission to processor 70 via network 90. Processor 70 monitors network, or data bus, 90 for messages bearing its address, and removes such message from the bus as they are received.

Thus, in accord with an aspect of the inventive restoration architecture, messages may be exchanged with processor 70 via either one of two diverse paths, i.e., satellite or terrestrial.

Upon receipt of the message, processor 70, which may be, for example, the Hewlett Packard Co. Model 9000-860 computer, updates TABLE 1 of FIG. 2 contained in associated memory (not shown). Processor 70 also updates other such tables (not shown) that are designed to track the status of fibers that are in service. In addition, processor 70, responsive to receipt of a node processor 40 message identifying an inoperable link or a degraded link, invokes the program that is designed to locate spare capacity in order to establish one or more orders of connectivity so that the affected original traffic may be restored to service. As mentioned above, such a restoration algorithm or program could be, for example, the program disclosed in the aforementioned Mansour et al patent application, discussed above. When the program locates such capacity, it then sends messages to each DCA that would be involved in establishing such connectivity, as mentioned above. That is, the program supplies to SAI 75 for transmission to a particular DCA a connectivity message, in which the message includes in a header the identity of the DCA and associated node. SAI 75 (which is similar to SAI 50), in turn, modulates, in the manner described above, the signals forming the connectivity message and supplies the result to antenna 57 for transmission to satellite 56. Satellite 56 retransmits the connectivity message, which is received by each of the network nodes via their respective antennas. However, the message is accepted only by that SAI 50 whose associated network node address is contained in the message. The SAI 50 then passes the message to its associated DCA via bus 31 so that the latter may order its switching scheme to establish a portion of the desired restoration loop (alternate route).

(It is noted that, alternatively, such connectivity messages may be transported via network 90, as mentioned above.)

In addition, processor 70 sends to each processor 40 disposed at respective transfer-end points of a newly established alternate route, one or more messages requesting the processor 40 to confirm the continuity of the established alternate route. If the testing of the alternate route confirms such continuity, then the affected traffic is switched to the alternate route. If the test does not confirm such continuity, then processor 40 sends to processor 70 a message indicative of that fact. Processor 70, in turn, outputs to a terminal a modified version of the received message. A craftperson positioned at the terminal may then direct processor 70 to (a) "dismantle" the established alternate route, (b) search for another alternate route in the manner described above, (c) establish, in the manner described above, the latter alternate route, if available, and (d) request processor 40 to test the continuity of the newly established route. If processor 70 finds that an alternate route is not available, then it outputs to the terminal (not shown) a message indicative of that fact.

Processor 40 performs such continuity testing by sending to its associated DCA 30 connectivity messages to establish a test access path to confirm the continuity of a newly established DS3 circuit. In addition, processor 40 causes its associated restoration test equipment (RTE) 45 to send over one direction of the newly established circuit test signals defining, inter alia, an identity code, e.g., the identity of DS3 circuit that is being tested. An RTE 45 disposed at the opposite end of the alternate route established by that circuit and responsive to receipt of the test signals compares the received identity code with a code received from processor 70. If the comparison is found to be true, then the receiving RTE 45 returns an acknowledgement signal. Upon receipt of that signal, the RTE 45 which sent the test signals, in turn, notifies, its associated processor 40, which, in turn, notifies processor 70. The RTE 45 disposed at the opposite transfer end point performs a continuity test on the same DS3 circuit in a similar manner, but in the opposite direction.

If the test proves out be successful, then processor 70 sends to the pertinent processor 40, via the aforementioned transmission path, a message to transfer the affected traffic to the newly established alternate route.

To facilitate such continuity testing, each RTE 45, which may be, for example, the model 8186 microcomputer commercially available from Intel Corp., connects to a number of DCA 30 port circuits—illustratively fourteen port circuits—via respective communications paths 47-1 through 47-N. In this way, an RTE 45 operating in conjunction with an RTE 45 disposed at the opposite end of a newly established alternate route and at the direction of their respective processor 40, may test simultaneously the continuity of fourteen DS3 circuits. That is, responsive to receipt of an appropriate message from processor 70, processor 40 sends to DCA 30 via bus 44 a message designed to cause DCA 30 to establish a cross-connection between a DS3 circuit that is to be tested and one of the RTE 45 ports 47-1 through 47-N. Processor 70 then sends to RTE 45 via processor 40 a message requesting that a continuity test be performed over the selected one of the port, 47-1 through 47-N, in which the message includes the aforementioned identity code. RTE 45 returns to processor 40 via bus 46 the results of the test.

In a similar manner, processor 40 at the direction of controller 70 may direct RTE 45 to verify a failure. That is, processor 40 may cause RTE 45 to be bridged via one of its connections 47-1 through 47-N onto a DCA 30 circuit for the purpose of determining whether the circuit has indeed failed. If the circuit has failed, then, an upstream node will transmit over the DS3 circuit a so-called alarm indication signal. Thus, the presence of that signal, the presence of a signal which is undecipherable or the absence of any type of signal, provides an indication that the circuit is faulty. This aspect may be best explained by referring to FIG. 1 and assuming that nodes 100-1 and 100-5 are the transfer end points of a route formed by links 102 through 105. Since it has been assumed that link 103 has failed, then nodes 100-1 and 100-4 will transmit over the fibers respectively forming links 102 and 105 the alarm indication signal. The RTEs respectively disposed in nodes 100-2 and 100-5 will detect that signal when bridged onto appropriate ones of the fibers of links 102 and 105 and report the result to central controller 70 via their associated processor 40.

Figure 4:
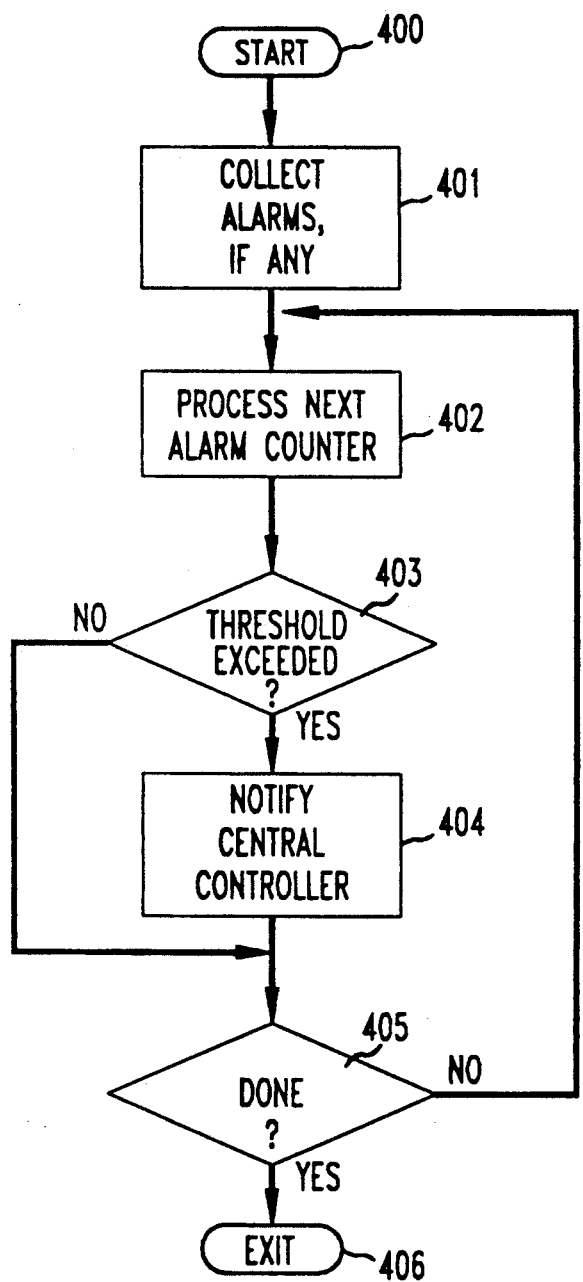
FIGS. 4 and 5 are flow charts of the software which implements the invention in an alarm processor of FIG. 3.

Turning now to FIG. 4, there is shown in flowchart form the program which performs the alarm processing function in processor 40 once each polling cycle. As mentioned above, processor 40 is arranged to periodically poll LTEs 20-1 through 20-N for alarms that may have occurred following the previous polling interval. In particular, the program is entered at block 400 and proceeds to block 401 where it polls its associated LTEs and collects such alarms, if any. If the program receives an alarm from an LTE, e.g., LTE 20-1, then it increments the associated alarm counter in the manner discussed above. After processing such alarms, the program proceeds to block 402 where it obtains the contents of an active alarm counter and then proceeds to block 403. At block 403, the program compares the value represented by such contents with the aforementioned predetermined threshold. If the value equals or exceeds the threshold, then the program proceeds to block 404. Otherwise, the program proceeds to block 405.

At block 404, the program sends to central controller 300 a message identifying, inter alia, the (a) associated node, (b) alarm types, and (c) circuits which generated the alarm. The program then proceeds to block 405 where it checks to see if it has completed processing all active alarm counters, and exits via block 406 if it finds that to be the case. Otherwise, the program returns to block 402 to process the next alarm counter.

Figure 5:
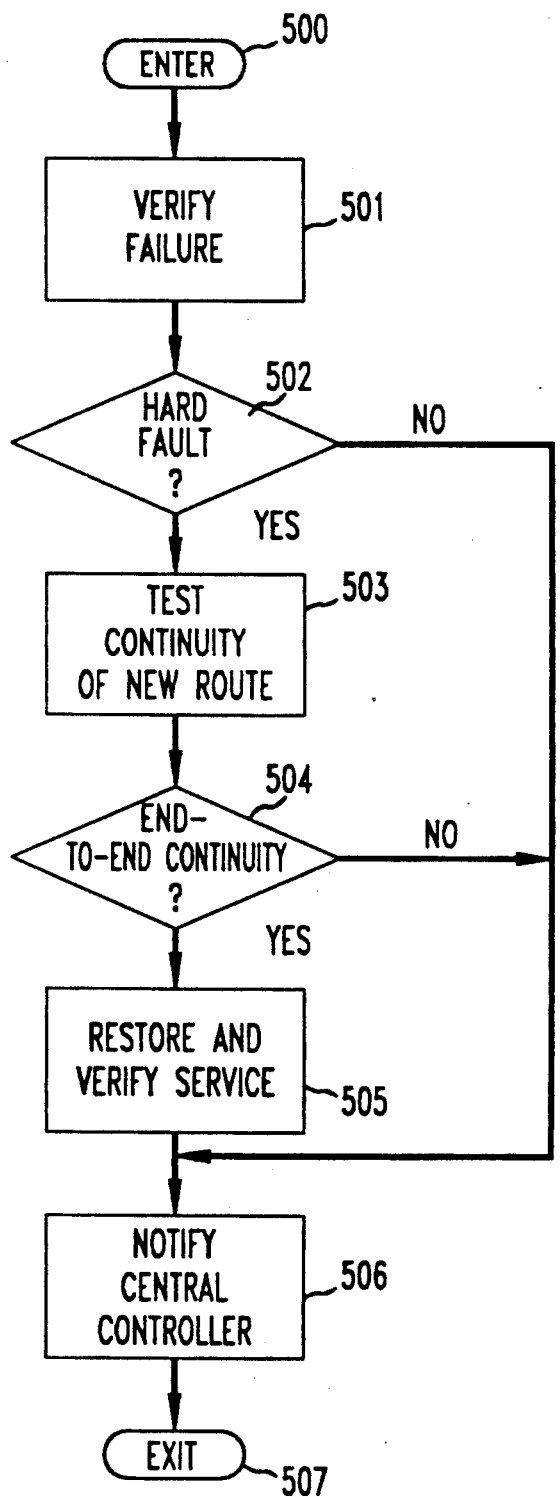

Turning now to FIG. 5, there is shown in flowchart form the processor 40 program which, inter alia, tests the continuity of an alternate route established by central controller 300.

In particular, the program is entered at block 500 responsive to receipt of a message from central controller 300 requesting a verification of a failure identified by an alarm report priorly sent to central controller 300 and a request to test the continuity of a circuit forming a newly established route identified in the message. At block 500, the program proceeds to block 501 where it instructs its associated DCA 30 to connect the associated RTE 45 to one or more circuits of the failed link and instructs the RTE to verify the failure, in the manner discussed. The program then proceeds to block 502 to await a response from its associated RTE 45 and proceeds to block 503 if the RTE response verifies the failure. If the response does not verify the failure, then the program proceeds to block 506 where it sends to central controller 300 a message noting that fact.

At block 503, the program, in the manner described above, tests the continuity of each circuit forming the newly established route. If all of the circuits "pass" the continuity test then the program proceeds to block 505 where it instructs its associated DCA 30 to transfer the affected traffic to such circuits. In addition, the program causes the associated RTE 45 to monitor the newly established circuits to verify that such circuits are indeed transporting the affected traffic. The program then proceeds to block 506 where it notifies central controller 300 that the affected traffic has been successfully transferred to the newly established route.

Figure 6:
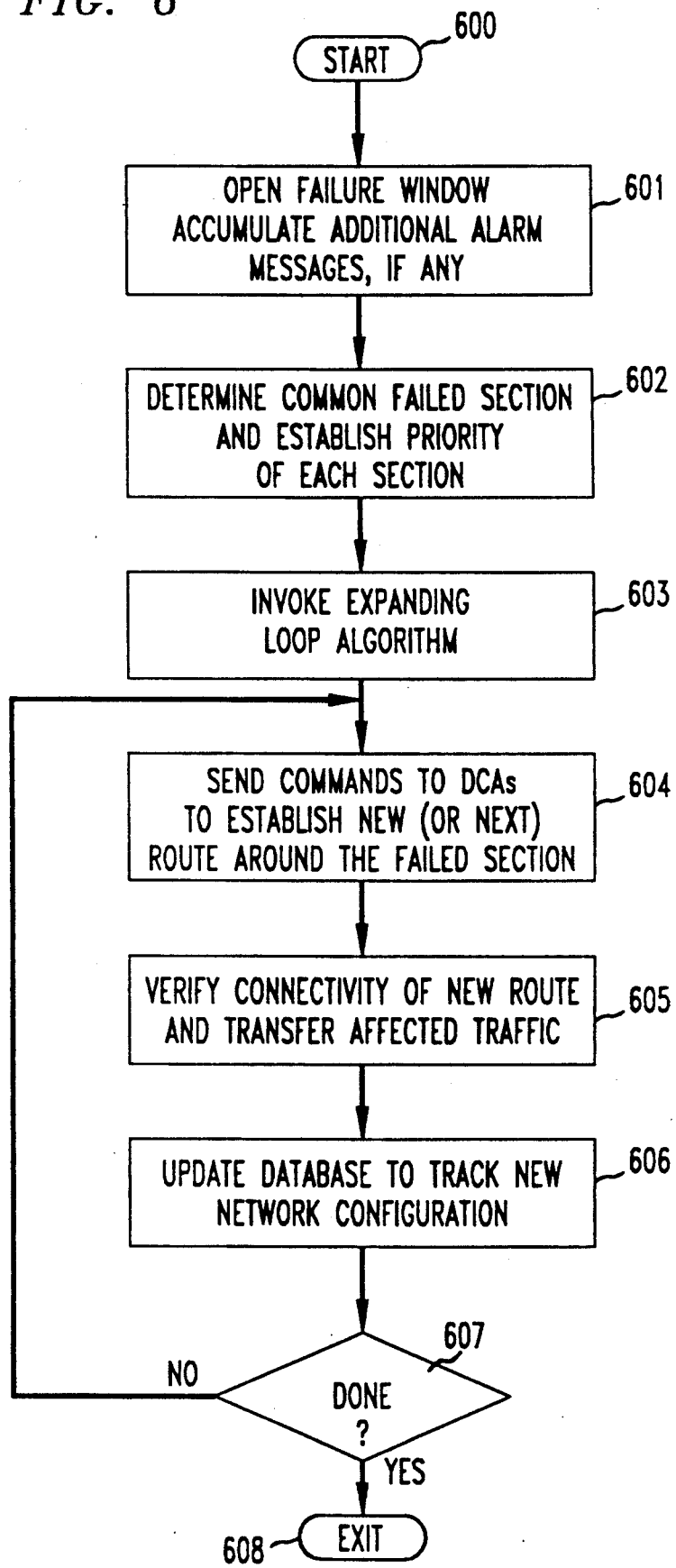
FIG. 6 is a flow chart of the software which implements the invention in a central controller of FIG. 3.

Turning now to FIG. 6, there is shown in flowchart form the program which implements the inventive architecture in the processor 70 of central controller 300. In particular, the program is entered at block 600 upon receipt of an alarm message transmitted by a particular one of the network alarm processors 40. At block 600, the program proceeds to block 601 where it opens the aforementioned window to await receipt of other alarms. At the end of the period of time defining the window—illustratively three seconds—the program proceeds to block 602. At block 602, it determines the extent of the failure based on the alarms that it received during the window. The program then determines the priorities of the various types of traffic affected by the failure(s) which is the source of the alarms. That is, the program determines if the affected traffic is so-called critical traffic, such as, for example, traffic originated by certain government agencies (high priority), private line traffic (second highest priority), private network traffic (third highest priority), conventional traffic (fourth highest priority) and so on. The program also determines the volume of traffic for each such category. The program then proceeds to block 603 where it invokes a so-called expanding loop program designed to locate spare capacity from which a number of orders of connectivity (alternate routes) may be established to reroute the affected traffic, in which the extent of such connectivity may be, for example, a pair of optical fibers on one or more alternate routes, and in which each optical fiber pair provides, for example, 36 DS3 circuits.

As also mentioned above, such an expanding loop algorithm may be the algorithm disclosed in the aforementioned Mansour et al patent application, which is shown in FIG. 7 of that patent application and which is incorporated herein by reference.

Once the program completes its task at block 603 it then proceeds to block 604 where it establishes, in the manner discussed above, the first-(or next-)order of connectivity. The program then proceeds to block 605, where it sends to the processors 40 associated with the transfer-end nodes involved in establishing the first-(or next-)order of connectivity commands, or messages, requesting a test of the continuity of the established route and identifying the affected traffic that is to be transferred to that route if such continuity is verified, in which the order of transferring such traffic is based on the priority of the traffic and its volume, as mentioned above. The program then proceeds to block 606 upon receipt from the processors 40 involved in the test messages confirming such continuity and that the affected traffic has been transferred thereto. If such messages do not confirm the continuity of the established route, then the program terminates that route, and returns to block 604 to establish the next order of continuity.

At block 606, the program updates its database including Table 1 of FIG. 2 to reflect the change in the configuration of the associated network and then proceeds to block 607. At block 607, the program "checks" to see if it has established all orders of connectivity located by the program at block 603 and exits via block 608 if it finds that to be the case. Otherwise, the program returns to block 604 to establish the next-order of connectivity.

The program at block 604 proceeds to block 606 for each such circuit which fails the continuity test. In this instance, the program sends to central controller 300 a message identifying the circuit which failed the continuity test. The program then exits via block 607.

The foregoing is merely illustrative of the principles of the invention. Those skilled in the art will be able to devise numerous arrangements, which, although not explicitly shown or described herein, nevertheless embody those principles that are within the spirit and scope of the invention. For example, it can be appreciated from the foregoing detailed discussion that the invention may be readily practiced in systems employing a transmission rate that is either less than or greater than the DS3 rate. Also, the invention may be practiced in a system employing almost any type of digital cross-connect arrangement, such as, for example, the Digital Access and Cross-Connect System IV commercially available from AT&T.

We claim:

1. A service restoration system for use in a communications network formed from a plurality of nodes interconnected by a plurality of transmission links, said system comprising means, contained in individual ones of said nodes, for polling associated ones of said nodes and links for alarms indicative of at least a disruption in the flow of traffic, and, responsive to receiving from a particular one of said associated nodes and links at a rate which equals a predetermined threshold one of said alarms, for outputting to one of a number of communications paths a message at least identifying said traffic disruption and its location, central control means operative, responsive to receipt of said message via said one communications path, for locating spare capacity contained in individual other ones of said links, and for dynamically establishing from said spare capacity a number of orders of connectivity to route said disrupted traffic around said particular one of said associated nodes or links which generated said one alarm condition, and means, responsive to receipt from said central control means via one of said communications paths a message requesting a continuity test of a particular one of said orders of connectivity, for monitoring said particular one of said associated ones of said nodes and links which generated said one alarm condition to verify said disruption, and for then testing for continuity said one order of connectivity so that either a portion or all of said disrupted traffic may be transferred thereto.

2. The system set forth in claim 1 wherein said one order of connectivity includes transfer end nodes disposed at respective ends of said one order of connectivity, and wherein said continuity test is performed at each of said transfer end nodes.

3. The system set forth in claim 2 wherein said transfer end nodes perform said continuity test by exchanging signals indicative of a predetermined identity code and wherein said continuity is confirmed when said tranfer end nodes receive said identity code from each other.

4. The system set forth in claim 3 wherein said one order of connectivity includes at least one DS3 circuit in which one of said transfer end nodes transmits said identity code over said one circuit in a first direction and the other one of said transfer end nodes transmits said identity code over said one circuit in a second opposite direction.

5. The system set forth in claim 4 wherein said one order of connectivity comprises a plurality of DS3 circuits, and wherein said continuity test is performed on each of said circuits.

6. The system set forth in claim 1 wherein said means for polling includes means responsive to the results of said continuity test confirming said continuity between the transfer end points of said one order of connectivity for then transferring said portion or all of said degraded traffic thereto.

7. The system set forth in claim 6 wherein said means for polling further includes means, responsive to said continuity test not confirming said continuity, for then outputting to one of said communications paths a message indicative of such noncontinuity.

8. The system set forth in claim 7 wherein said central control means includes means, responsive to receipt via said one of said communications path said message indicative of said noncontinuity, for then locating and establishing another order of connectivity as a replacement for said one order of connectivity and for then causing the continuity of said other order of connectivity to be tested.

9. A service restoration system for use in a communications network formed from a plurality of nodes interconnected by a plurality of transmission links, said system comprising means, contained in individual ones of said nodes, for polling associated ones of said nodes and links for alarms indicative of at least a disruption in the flow of traffic, and, responsive to receiving from a particular one of said associated nodes and links at a rate which equals a predetermined threshold one of said alarms, for outputting to one of a number of communications paths a message at least identifying said traffic disruption and its location, and central control means operative, responsive to receipt of said message via said one communications path, for locating spare capacity contained in individual other ones of said links, and for dynamically establishing from said spare capacity a number of orders of connectivity to route said disrupted traffic around said particular one of said associated nodes or links which generated said one alarm condition, wherein one of said communications paths is a data network and another one of said communications paths is a satellite link.

10. The arrangement set forth in claim 9 wherein each of said links comprises at least one DS3 circuit.

11. A method of establishing an alternate traffic route in a communications network formed from a plurality of nodes interconnected by a plurality of transmission links, said method comprising the steps of polling associated ones of said nodes and links for alarms indicative of at least a disruption in the flow of traffic through ones of said associated ones of said nodes and links, responding to receipt of a particular one of said alarms at a rate which causes a predetermined threshold to be reached by outputting a message identifying at least said disruption and its location to one of a number of communications paths for delivery to a central control location, responding to receipt of said message at said central control location by locating spare capacity contained in individual ones of said links, establishing in real time from said spare capacity a number of orders of connectivity to route said degraded traffic around that one of said associated nodes or links which generated said one alarm condition, and responding to receipt from said central control location via one of said communications paths of a message requesting a continuity test of a particular one of said orders of connectivity by monitoring said particular one of said associated ones of said nodes and links which generated said one alarm condition to verify said disruption, and then testing the continuity of said one order of connectivity to determine if said disrupted traffic may be transferred thereto.

12. The method set forth in claim 11 wherein said one order of connectivity includes transfer end nodes disposed at respective ends of said one order of connectivity, and wherein said step of testing is performed at each of said transfer end nodes.

13. The method set forth in claim 12 wherein said transfer end nodes perform said continuity test step by exchanging signals indicative of a predetermined identity code and by confirming said continuity if said transfer end nodes receive said identity code from each other.

14. The method set forth in claim 13 wherein said step of polling includes the step of responding to said continuity test not confirming said continuity by then outputting to one of said communications paths a message indicative of such noncontinuity.

15. The method set forth in claim 14 wherein said step of establishing includes the step of responding to receipt via said one of said communications path of said message indicative of said noncontinuity by locating and establishing another order of connectivity as a replacement for said one order of connectivity and by causing the continuity of said other/order of connectivity to be tested.

16. A method of establishing an alternate traffic route in a communications network formed from a plurality of nodes interconnected by a plurality of transmission links, said method comprising the steps of polling associated ones of said nodes and links for alarms indicative of at least a degradation in the flow of traffic through one of said associated ones of said nodes and links, responding to receipt of a particular one of said alarms at a rate which causes a predetermined threshold to be reached by outputting to one of a number of communications paths for delivery to a central control location a message at least identifying said traffic degradation and its location, responding to receipt of said message at said central control location by locating spare capacity contained in individual other ones of said links, establishing in real time from said spare capacity a number of orders of connectivity to route said degraded traffic around that one of said associated nodes or links which generated said one alarm condition, responding to receipt from said central control location via one of said communications paths a message requesting a continuity test of a particular one of said orders of connectivity by monitoring said particular one of said associated ones of said nodes and links which generated said one alarm condition to verify said degradation, and then testing the continuity of said one order of connectivity to determine if said degraded traffic may be transferred thereto, and wherein said one order of connectivity includes at least one DS3 circuit connected between transfer end nodes, in which one of said transfer end nodes transmits said identity code over one direction of said circuit and the other one of said transfer end nodes transmits said identity code over the other opposite direction of said circuits.

17. The method set forth in claim 12 wherein said one order of connectivity comprises a plurality of DS3 circuits, and wherein said continuity test step is performed on each of said circuits.

18. The method set forth in claim 11 wherein said polling step includes the step of responding to the confirmation of continuity between the transfer end points of said one order of connectivity by then transferring said portion or all of said degraded traffic to said one order of connectivity.

19. A method of establishing and alternate traffic route in a communications network formed from a plurality of nodes interconnected by a plurality of transmission links, said method comprising the steps of polling associated ones of said nodes and links for alarms indicative of at least a degradation in the flow of traffic through one of said associated ones of said nodes and links, responding to receipt of a particular one of said alarms at a rate which causes a predetermined threshold to be reached by outputting to one of a number of communications paths for delivery to a central control location a message at least identifying said traffic degradation and its location, in which one of said communications paths is a data network and in which another one of said communications paths is a satellite link, responding to receipt of said message at said central control location by locating spare capacity contained in individual other ones of said links, and establishing in real time from said spare capacity a number of orders of connectivity to route said degraded traffic around that one of said associated nodes or links which generated said one alarm condition.

20. The method set forth in claim 19 wherein each of said links comprises at least one DS3 circuit.

* * * * *